(12) United States Patent
Inatani et al.

(10) Patent No.: US 7,814,503 B2
(45) Date of Patent: Oct. 12, 2010

(54) OPTICAL DISK DEVICE AND ADJUSTING METHOD THEREOF

(75) Inventors: Takeshi Inatani, Kyoto (JP); Akihiro Fukasawa, Kyoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 473 days.

(21) Appl. No.: 11/921,774

(22) PCT Filed: Apr. 7, 2006

(86) PCT No.: PCT/JP2006/307420

§ 371 (c)(1),
(2), (4) Date: Dec. 7, 2007

(87) PCT Pub. No.: WO2007/029370

PCT Pub. Date: Mar. 15, 2007

(65) Prior Publication Data

US 2009/0210891 A1      Aug. 20, 2009

(30) Foreign Application Priority Data

Sep. 8, 2005      (JP) .............................. 2005-260464

(51) Int. Cl.
*G11B 17/04* (2006.01)

(52) U.S. Cl. ..................................................... 720/601

(58) Field of Classification Search ......... 720/601–604, 720/623, 711, 624, 646, 621, 619, 615, 626, 720/620, 704, 706, 715, 652, 707, 622, 655, 720/610, 713, 696, 712
See application file for complete search history.

(56) References Cited

U.S. PATENT DOCUMENTS

| | | | | | |
|---|---|---|---|---|---|
| 4,794,476 | A | * | 12/1988 | Isaki et al. | ..................... 360/93 |
| 4,951,164 | A | * | 8/1990 | Yasaka et al. | ................. 360/85 |
| 2004/0071073 | A1 | | 4/2004 | Toyama et al. | |
| 2005/0207302 | A1 | * | 9/2005 | Kimura | .................... 369/53.19 |
| 2005/0289581 | A1 | * | 12/2005 | Wang | ......................... 720/700 |
| 2007/0083880 | A1 | * | 4/2007 | Bae | ............................. 720/675 |
| 2007/0300245 | A1 | * | 12/2007 | Tsutsumi et al. | ............ 720/619 |
| 2010/0122272 | A1 | * | 5/2010 | Fujii | ........................... 720/620 |

FOREIGN PATENT DOCUMENTS

| | | |
|---|---|---|
| EP | 1669986 A2 | 6/2006 |
| JP | 11-224438 A | 8/1999 |
| JP | 2002-100131 A | 4/2002 |
| JP | 3428832 B2 | 5/2003 |
| JP | 2003-288728 A | 10/2003 |

\* cited by examiner

*Primary Examiner*—Allen T Cao
(74) *Attorney, Agent, or Firm*—Birch, Stewart, Kolasch & Birch, LLP

(57) ABSTRACT

An adjustment holding portion (21) for adjusting the inclination of a guide shaft (22) guiding an optical pickup (2) in a radial direction with respect to a base (1) is mounted to the base (22) at a first supporting point (1n), a second supporting point (23) and a third supporting point (24). When the optical pickup (2) is located at a first position on the inner circumference side of the optical disk, the shaft-receiving portion (2c) of the optical pickup (2) is located on a line connecting the first supporting point and the second supporting point. When the optical pickup (2) is located at a second position on the outer circumference side of the optical disk, the shaft-receiving portion (2c) of the optical pickup (2) is located on a line connecting the first supporting point and the third supporting point.

8 Claims, 12 Drawing Sheets

OPTICAL DISK DEVICE AND ADJUSTING METHOD THEREOF

TECHNICAL FIELD

This invention relates to an optical disk device, and particularly relates to an optical disk device having an inclination angle adjusting mechanism for adjusting an inclination angle of an optical pickup with respect to a signal recording surface of the optical disk and an adjusting method thereof.

BACKGROUND ART

In an optical disk device, if the direction of the exit optical axis of the optical pickup is inclined with respect to the signal recording surface of the optical disk, an aberration may occur, and it may become impossible to correctly record and reproduce information signal. Therefore, the optical disk device is provided with a mechanism for adjusting the inclination angle (i.e., the direction of the exit optical axis) of the optical pickup with respect to the signal recording surface of the optical disk.

In the inclination angle adjustment of the optical pickup, the inclination angle adjustment in the radial direction of the optical disk, and the inclination angle adjustment in the tangential direction of the optical disk are performed. The inclination angle adjustment in the radial direction is performed by adjusting the inclination of the spindle motor (for rotating the optical disk) in the radial direction of the optical disk, or by adjusting the inclination of a main shaft for guiding the optical pickup. After the inclination angle adjustment in the radial direction is completed, the inclination angle adjustment in the tangential direction is performed by adjusting the inclination of the spindle motor in the tangential direction of the optical disk, or by adjusting the inclination of a secondary shaft (a guide shaft provided parallel to the main shaft) for guiding the optical pickup.

The above described inclination angle adjustment of the secondary shaft is performed by adjusting the heights of both ends of the secondary shaft using adjusting screws or the like. To be more specific, the following methods are known. In a first method, one end of the secondary shaft is adjusted so that the secondary shaft is parallel to the main shaft. Then, the optical disk device is brought into a reproducing state, and the heights of both ends of the secondary shaft are adjusted by the same amounts so that the secondary shaft and the main shaft are at the same heights, while monitoring the reproduced signal.

However, this first method needs two-stage adjustments including a first stage adjustment for parallelizing the secondary shaft to the main shaft, and a second stage adjustment for having the secondary shaft at the same height as the main shaft. Further, it is difficult to adjust the heights of both ends of the secondary shaft by the same amounts, and it is necessary to use an exclusive tool.

Therefore, the following second method is proposed. In the second method, the optical disk device is brought into the reproducing state. Then, the optical pickup is moved to the end portion on the disk inner circumference side, and the height of one end (an end closer to the optical pickup) of the secondary shaft is adjusted while monitoring the reproduced signal. Thereafter, the optical pickup is moved to the end portion on the outer circumference side, and the height of the other end of the secondary shaft is adjusted while monitoring the reproduced signal (see, for example, Patent Document Nos. 1 and 2).

Patent Document No. 1: Japanese Patent Publication No. 3428832 (Pages 4-5, FIG. 5).
Patent Document No. 2: Japanese Laid-Open Patent Publication No. 2002-100131 (Pages 2-3, FIG. 1).

DISCLOSURE OF THE INVENTION

Problems to be Solved by the Invention

However, in the above described second method, when the height of one end of the secondary shaft is adjusted, the heights of all the portions of the secondary shaft except the other end (as a fulcrum) of the secondary shaft vary. Therefore, after the height of one end of the secondary shaft is adjusted while the optical pickup is located at the end portion on the inner circumference side of the optical disk, and when the optical pickup is moved to the end portion on the outer circumference side to adjust the height of the other end of the secondary shaft, the height of the portion of the secondary shaft where the optical pickup has been located on the previous adjustment may vary, so that the deviation of adjustment may occur. Therefore, it is necessary to repeatedly adjust the heights of one end and the other end of the secondary shaft for settling the adjustment, and therefore the adjustment requires a long time.

The present invention is intended to solve the above described problems, and the object of the present invention is to make it unnecessary to repeat adjustment, in adjusting the heights of one end and the other end of the secondary shaft while locating the optical pickup respectively at predetermined positions on the inner circumference side and the outer circumference side of the optical disk, and to reduce the time required for the adjustment.

Means of Solving the Problems

An optical disk device according to the present invention includes a base, a disk rotation driving mechanism provided on said base, an optical pickup on which an optical system is mounted for emitting a light beam onto the optical disk rotated by the disk rotation driving mechanism and which further has a shaft-receiving portion, a guide shaft that engages the shaft-receiving portion and guides the optical pickup movably in a radial direction, and an adjustment holding portion that holds the guide shaft so that an inclination of the guide shaft with respect to the base is adjustable. The adjustment holding portion is mounted to the base at first, second and third supporting points. Heights of the second and third supporting points are adjustable in the direction of a rotation axis of the optical disk. When the optical pickup is located at a first position on the inner circumference side of the optical disk, the shaft-receiving portion is located on a line connecting the first supporting point and the second supporting point. When the optical pickup is located at a second position on the outer circumference side of the optical disk, the shaft-receiving portion is located on a line connecting the first supporting point and the third supporting point.

Effect of the Invention

According to the present invention, after the height of one end of the secondary shaft is adjusted while the optical pickup is located at the first position on the disk inner circumference side, and when the optical pickup is moved to the second position on the disk outer circumference side to adjust the height of the other end of the secondary shaft, the height of the portion of the secondary shaft where the optical pickup has been located in the previous adjustment does not vary. Therefore, it is not necessary to repeat the adjustment, and the time required for the adjustment can be shortened.

DESCRIPTION OF REFERENCE MARKS

1 . . . base, 1n . . . supporting portion, 2 . . . optical pickup, 2a . . . shaft-receiving portion, 2b . . . shaft-receiving portion, 2c . . . shaft-receiving portion, 4 . . . turntable, 5 . . . disk motor, 7 . . . disk rotation driving mechanism, 21 . . . adjustment holding portion, 22 . . . secondary shaft, 23, 24 . . . adjusting screw, 31 . . . main shaft.

BEST MODE FOR CARRYING OUT THE INVENTION

Embodiment 1

Figure 1:
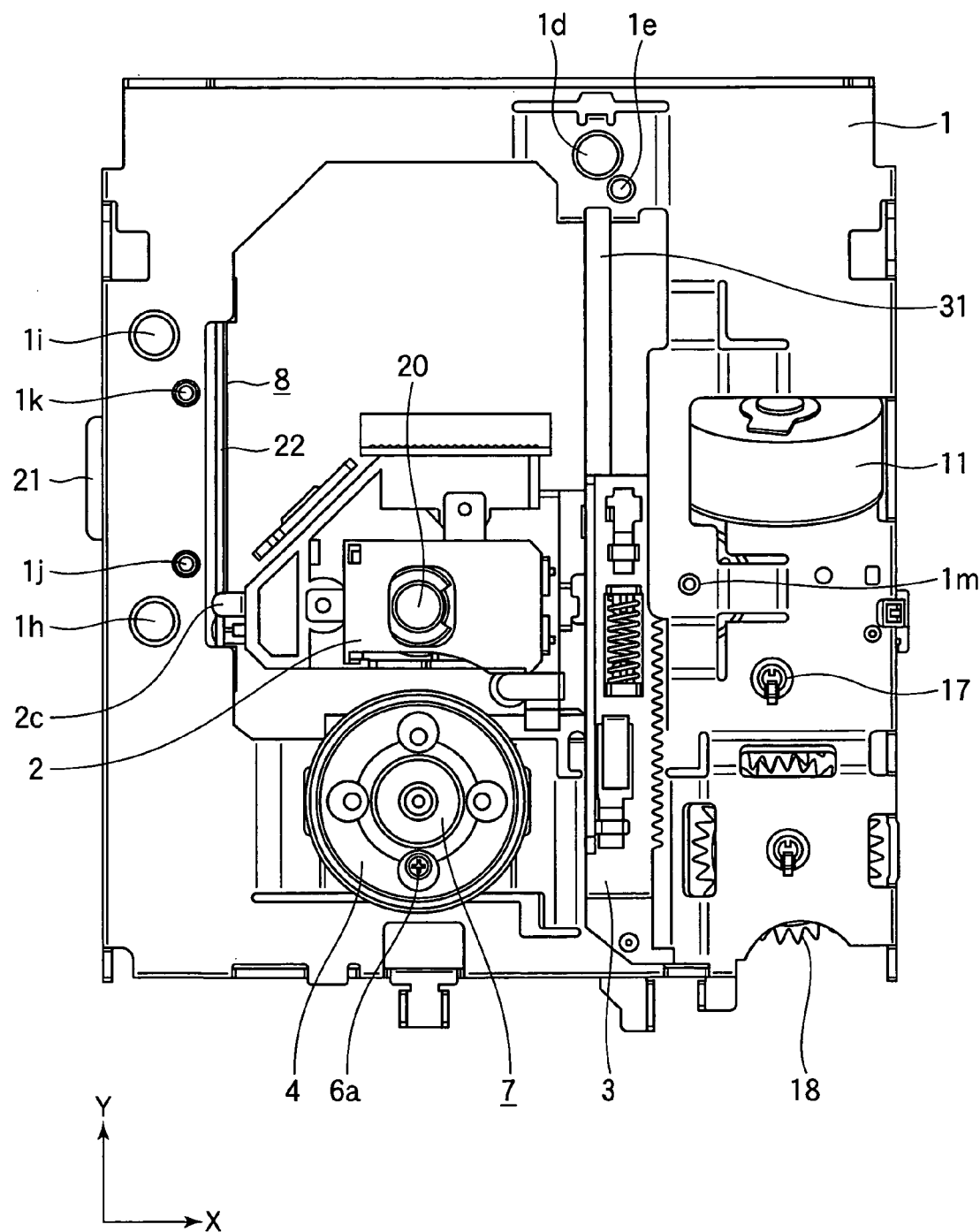
FIG. 1 is a plan view showing an internal configuration of an optical disk device according to Embodiment 1 of the present invention.
Figure 2:
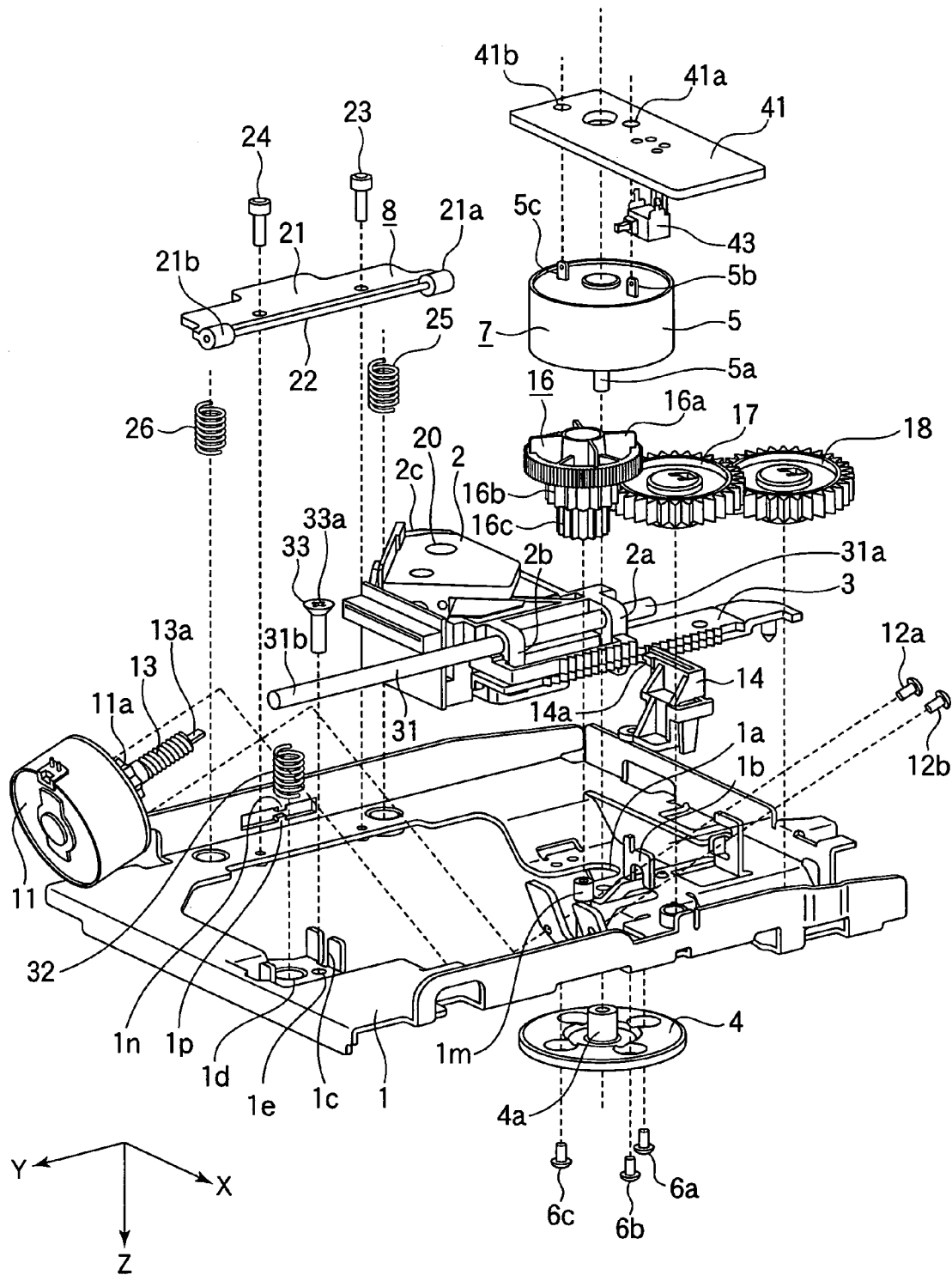
FIG. 2 is an exploded perspective view showing the optical disk device according to Embodiment 1 of the present invention.
Figure 3:
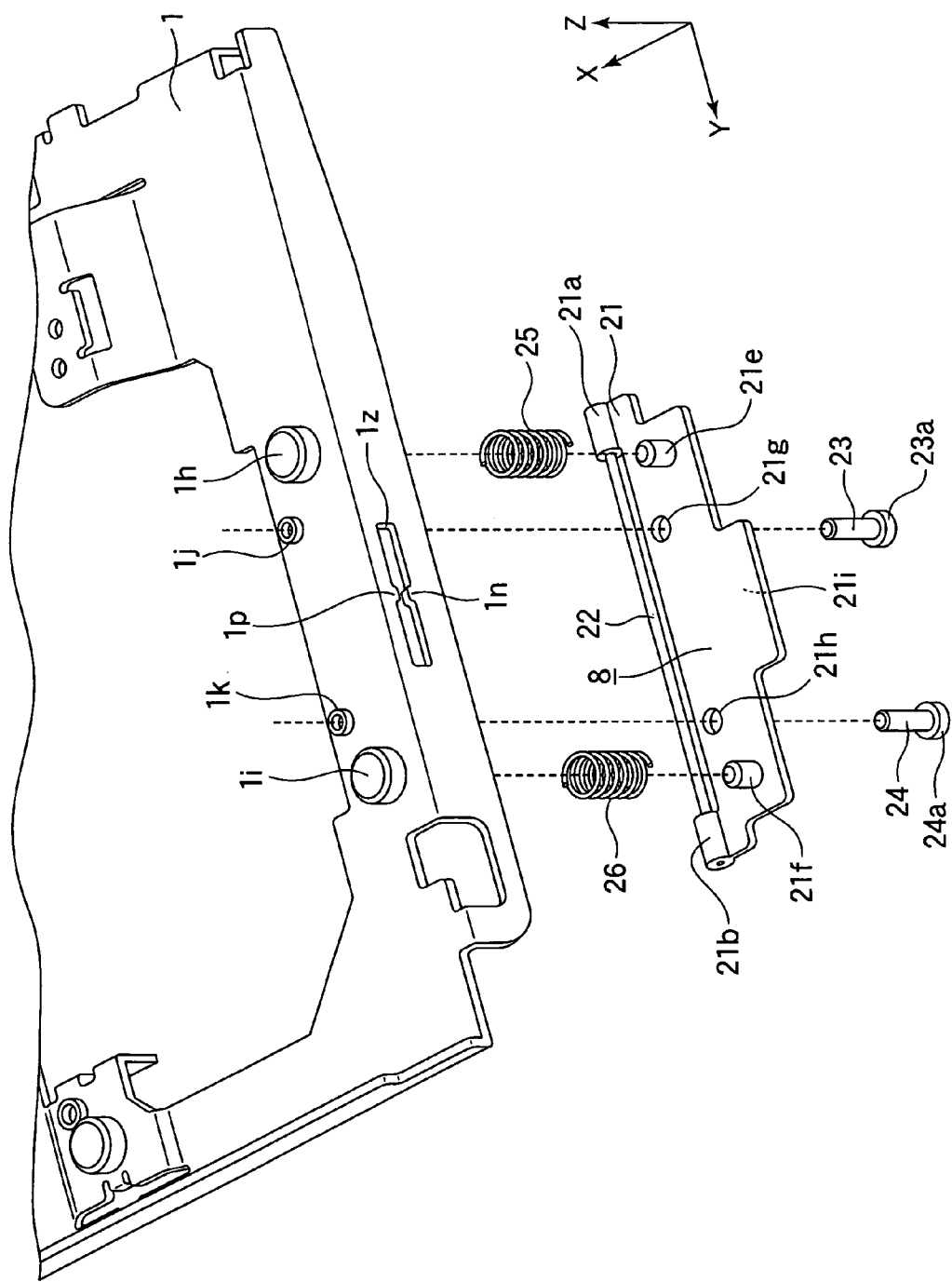
FIG. 3 is an exploded perspective view showing an inclination angle adjusting mechanism of the optical disk device according to Embodiment 1 of the present invention.
Figure 4:
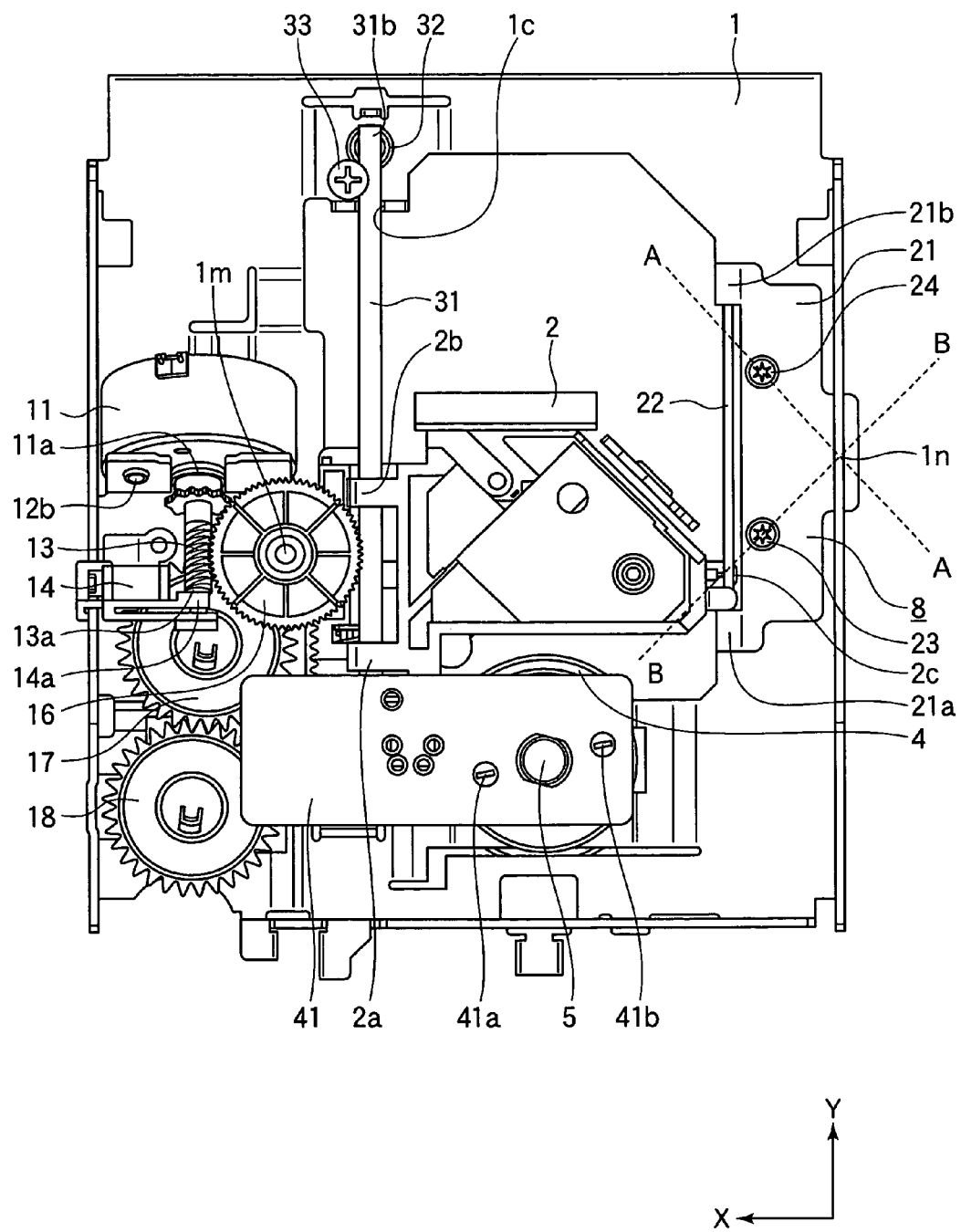
FIG. 4 is a bottom view showing the internal configuration of the optical disk device according to Embodiment 1 of the present invention.
Figure 5:
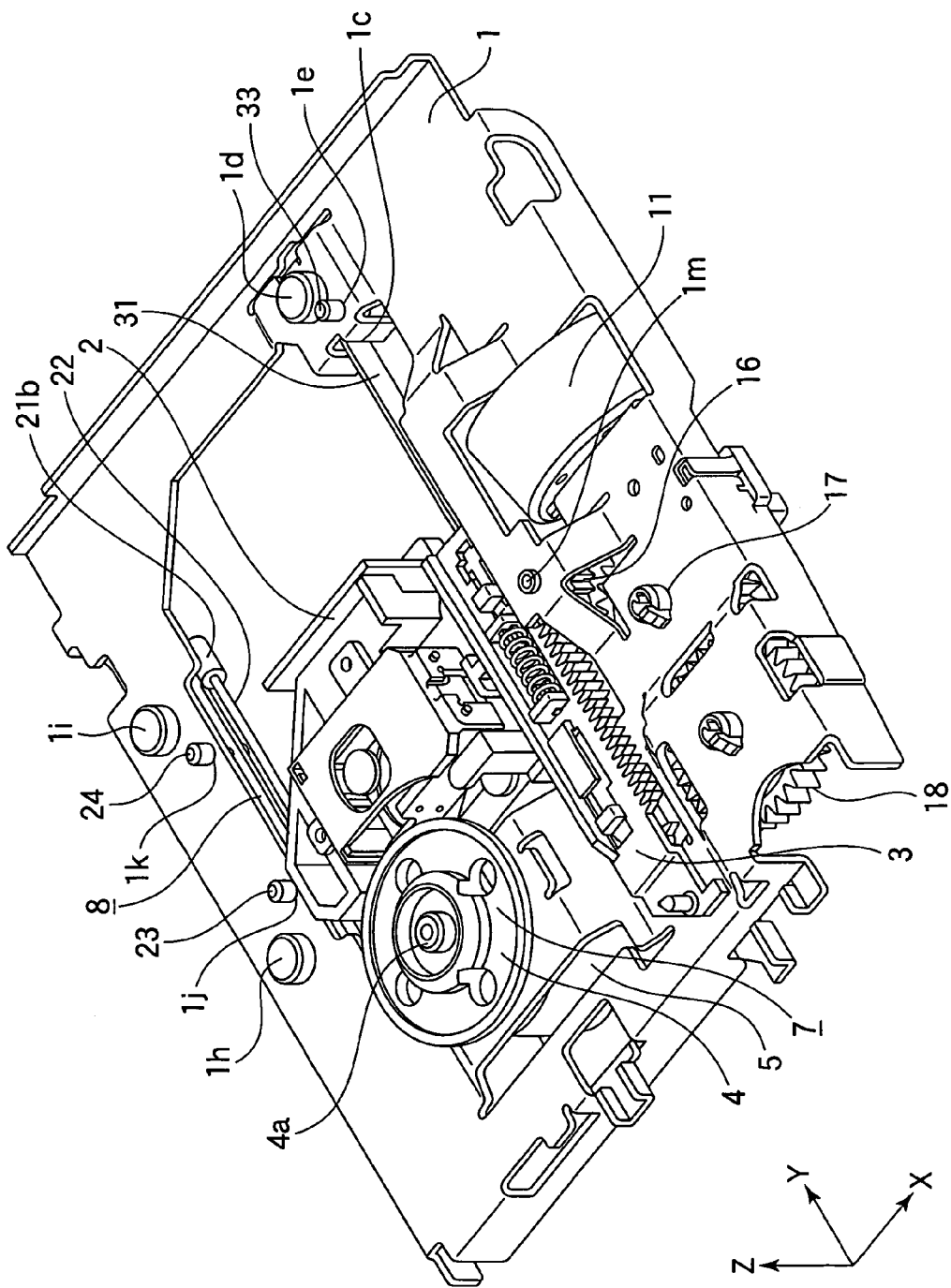
FIG. 5 is a perspective view showing the internal configuration of the optical disk device according to Embodiment 1 of the present invention as seen from above.
Figure 6:
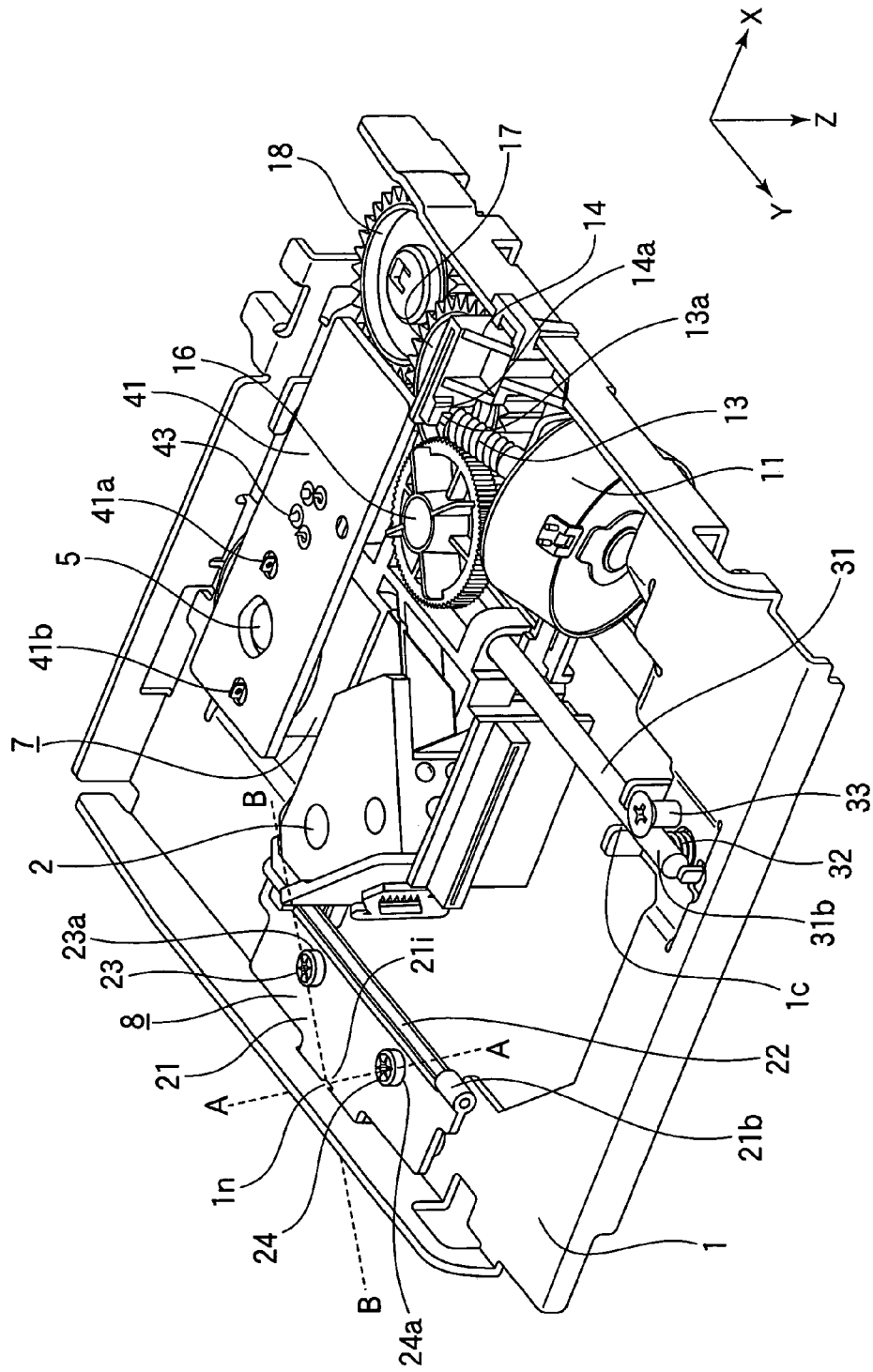
FIG. 6 is a perspective view showing the internal configuration of the optical disk device according to Embodiment 1 of the present invention as seen from below.

FIG. 1 is a plan view showing an internal configuration of an optical disk device according to Embodiment 1 of the present invention. FIG. 2 is an exploded perspective view showing the optical disk device according to Embodiment 1. FIG. 3 is an exploded perspective view showing an inclination angle adjusting mechanism of the optical disk device according to Embodiment 1. FIG. 4 is a bottom view showing the internal configuration of the optical disk device according to Embodiment 1. FIG. 5 is a perspective view showing the internal configuration of the optical disk device according to Embodiment 1 as seen from above. FIG. 6 is a perspective view showing the internal configuration of the optical disk device according to Embodiment 1 as seen obliquely from below.

As shown in FIG. 1, the optical disk device includes a base 1 as a supporting body. On the base 1, a turntable (i.e., a disk rotation driving mechanism) 4 for holding and rotating an optical disk and an optical pickup 2 that performs recording, reproducing or both on the optical disk rotated by the turntable 4 are provided. The optical pickup 2 moves in a radial direction of the optical disk held by the turntable 4 as will be described later in detail.

Here, the description will be made based on the hypothesis that the base 1 is placed on a horizontal plane (XY-plane). The direction of the rotation axis of the turntable 4 is defined as a vertical direction (Z direction). Along the Z direction, the direction from the optical pickup 2 (FIG. 2) toward the optical disk is defined as +Z direction, and the opposite direction is defined as −Z direction. The moving direction of the optical pickup 2 (the radial direction of the disk) is defined as Y direction. In the moving range of the optical pickup 2, the direction away from the turntable 4 is defined as +Y direction, and the direction toward the turntable 4 is defined as −Y direction. The direction perpendicular to both of the Y direction and the Z direction is defined as X direction.

As shown in FIG. 2, a disk motor 5 for driving the turntable 4 includes a rotation shaft 5a of the Z direction that is press-fit into a boss portion 4a of the turntable 4. When the disk motor 5 is driven, the turntable 4 rotates integrally with a rotation shaft 5a. The disk motor 5 is mounted to a disk motor mounting portion 1a of the base 1 at fixing screws 6a, 6b and 6c. Terminals 5b and 5c of the disk motor 5 are soldered to and engage terminal holes 41a and 41b formed on a substrate 41, so that the electric current is supplied from the substrate 41 to the disk motor 5. In addition, a detection switch 43 is mounted to the substrate 41, which detects the position of the optical pickup 2 in the radial direction of the disk.

A main shaft 31 and a secondary shaft 22 are fixed to the base 1, which guide the optical pickup 2 in the Y direction. Both of the main shaft 31 and the secondary shaft 22 extend in the Y direction, and are disposed at an interval in the X direction. An end portion 31a of the main shaft 31 engages and is fixed to a main shaft holding hole 1b formed on the base 1. The other end portion 31b of the main shaft 31 engages a slit portion 1c formed on the base 1, so that the position of the end portion 31b in the X direction is regulated.

A biasing spring 32 is provided on a position where the biasing spring 32 contacts the end portion 31b of the main shaft 31. The biasing spring 32 is held by a spring holding portion 1d provided on the base 1, and biases the end portion 31b of the main shaft 31 in the −Z direction. A flat head screw 33 engages an internal threaded portion 1e formed in the vicinity of the spring holding portion 1d of the base 1. A tapered portion 33a of the head of the flat head screw 33 restricts the movement of the end portion 31b of the main shaft 31 in the −Z direction. By rotating the flat head screw 33, the height of the end portion 31b of the main shaft 31 can be varied, so that the inclination angle of the main shaft 31 can be adjusted.

As shown in FIG. 3, the secondary shaft 22 is mounted to the base 1 via an adjustment holding portion 21. The adjustment holding portion 21 is, for example, a plate-like member whose surface is substantially parallel to the XY-plane, and which is elongated in the Y direction. The adjustment holding portion 21 has a pair of secondary shaft holding portions 21a and 21b at both ends thereof in the Y direction, which support both ends of the secondary shaft 22 in the axial direction.

Both ends of the secondary shaft 22 are fixed to the secondary shaft holding portions 21a and 21b by means of, for example, press-fitting, adhesion or the like.

Spring positioning bosses 21e and 21f are formed in the vicinity of the secondary shaft holding portions 21a and 21b of the adjustment holding portion 21. Spring holding portions 1h and 1i as concave portions are formed on positions of the base 1 facing the spring positioning bosses 21e and 21f of the adjustment holding portion 21. Biasing springs 25 and 26 are sandwiched respectively between the spring positioning bosses 21e and 21f of the adjustment holding portion 21 and spring holding portions 1h and 1i of the base 1. The biasing springs 25 and 26 constantly bias the adjustment holding portion 21 in −Z direction.

The adjusting screws 23 and 24 penetrate through holes 21g and 21h formed on the adjustment holding portion 21 in +Z direction, and engage internal threaded holes 1j and 1k formed on the base 1. With this, the position of the adjustment holding portion 21 with respect to the base 1 is regulated in the X direction and in the Y direction.

A contact portion 21i as a plate-like piece extends further in the X direction from the side end surface (end surface in the X direction) of the adjustment holding portion 21. On the side wall of the base 1, a slit 1z elongated in the Y direction is formed, which allows the contact portion 21i of the adjustment holding portion 21 to penetrate. A supporting portion in is formed on an inner end surface of the slit 1z to extend in +Z direction, and contacts the contact portion 21i.

The adjustment holding portion 21 is biased in the −Z direction by the above described biasing springs 25 and 26. In this regard, the supporting portion in of the base 1 contacts the contact portion 21i, and the head portion 23a and 24a of the adjusting screws 23 and 24 contact the portions around the through holes 21g and 21h of the adjustment holding portion 21. Therefore, the position of the adjustment holding portion 21 with respect to the base 1 is regulated in the Z direction.

As shown in FIG. 2, the optical pickup 2 is a movable body having an optical system 20 including an objective lens or the like. On an end portion of the optical pickup 2 in the X direction, shaft-receiving portions 2a and 2b are provided, which slidably engage the main shaft 31. Further, on the other end portion of the optical pickup 2 in the X direction, a shaft-receiving portion 2c is provided, which slidably engage the secondary shaft 22.

As shown in FIG. 4, a sled motor 11 for driving the optical pickup 2 is provided on the base 1. The sled motor 11 is fixed to the base 1 by means of fixing screws 12a and 12b (FIG. 2). The sled motor 11 has an output shaft 11a to which a worm gear 13 is fixed by means of press-fitting. A motor shaft biasing member 14 is provided on the base 1. The motor shaft biasing member 14 has a biasing portion 14a contacting a tip portion 13a of the worm gear 13, and biases the shaft portion 11a in the axial direction thereof.

A gear 16 is so provided that the gear 16 engages the worm gear 13. The gear 16 is rotatably supported by a gear shaft 1m fixed to the base 1 by swaging. As shown in FIG. 2, the gear 16 includes a large gear 16a, an intermediate gear 16b and a small gear 16c which are coaxially combined with one another. The large gear 16a engages the worm gear 13. The small gear 16c engages a rack 3 provided on the optical pickup 2, and transmits the driving force of the sled motor 11 to the optical pickup 2. The intermediate gear 16b transmits the driving force of the sled motor 11 to an optical disk loading mechanism (not shown) via gears 17 and 18 rotatably supported by the base 1.

Next, an inclination angle adjustment (i.e., an adjustment of the exit optical axis of the optical-pickup with respect to the optical disk) will be described with reference to FIGS. 4 through 7.

First, an inclination adjustment in the radial direction of the optical disk (i.e., an inclination adjustment about a line parallel to the X direction) is performed. To be more specific, the optical disk (not shown) is mounted on the turntable 4, the optical pickup 2 is moved to an end portion on the disk inner circumference side of the movable range for reproduction, and the reproduction of the optical disk is performed. While monitoring the reproduced signal detected by the optical pickup 2, the flat head screw 33 (FIG. 6) defining the height of the end portion 31b of the main shaft 31 on the outer circumference side is rotated using an adjusting tool. The flat head screw 33 is fixed at a position where the reproduced signal jitter is appropriate, so that the inclination of the optical pickup in the radial direction of the disk is adjusted.

Next, an inclination angle adjustment in the tangential direction of the optical disk (i.e., an inclination adjustment about a line parallel to the Y direction) is performed. To be more specific, a first adjustment and a second adjustment are performed as follows.

In the first adjustment, the optical pickup 2 is moved to an end portion (a first position) on the disk inner circumference side of the movable range for reproduction (see FIGS. 4 and 6), and the reproduction of the optical disk is performed. While monitoring the reproduced signal detected by the optical pickup 2, the adjusting screw 23 on the disk inner circumference side of the adjustment holding portion 21 is rotated by means of the adjusting tool. In this state, the adjustment holding portion 21 is rotated about a line A-A (FIG. 4) connecting the adjusting screw 24 (a third supporting point) and the supporting portion 1n (a first supporting point), with the result that the height (in the Z direction) of the shaft-receiving portion 2c of the optical pickup 2 engaging the secondary shaft 22 varies. The adjusting screw 23 is fixed at a position where the reproduced signal jitter is appropriate (i.e., the height of the second supporting point is adjusted), so that the inclination of the optical pickup 2 in the tangential direction of the disk (the inclination about a line parallel to the Y direction) at this position is adjusted.

In the second adjustment, the optical pickup 2 is moved to an end portion (a second position) on the disk outer circumference side of the movable range for reproduction (see FIG. 7), and the reproduction of the optical disk is performed. While monitoring the reproduced signal detected by the optical pickup 2, the adjusting screw 24 on the disk outer circumference side of the adjustment holding portion 21 is rotated by means of the adjusting tool. In this state, the adjustment holding portion 21 is rotated about a line B-B connecting the adjusting screw 23 (a second supporting point) and the supporting portion 1n (a first supporting point), so that the height (in the Z direction) of the shaft-receiving portion 2c of the optical pickup 2 engaging the secondary shaft 22 varies. The adjusting screw 24 is fixed at a position where the reproduced signal jitter is appropriate (i.e., the height of the third supporting point is adjusted), so that the inclination of the optical pickup 2 in the tangential direction of the disk (the inclination about a line parallel to the Y direction) at this position is adjusted.

Figure 7:
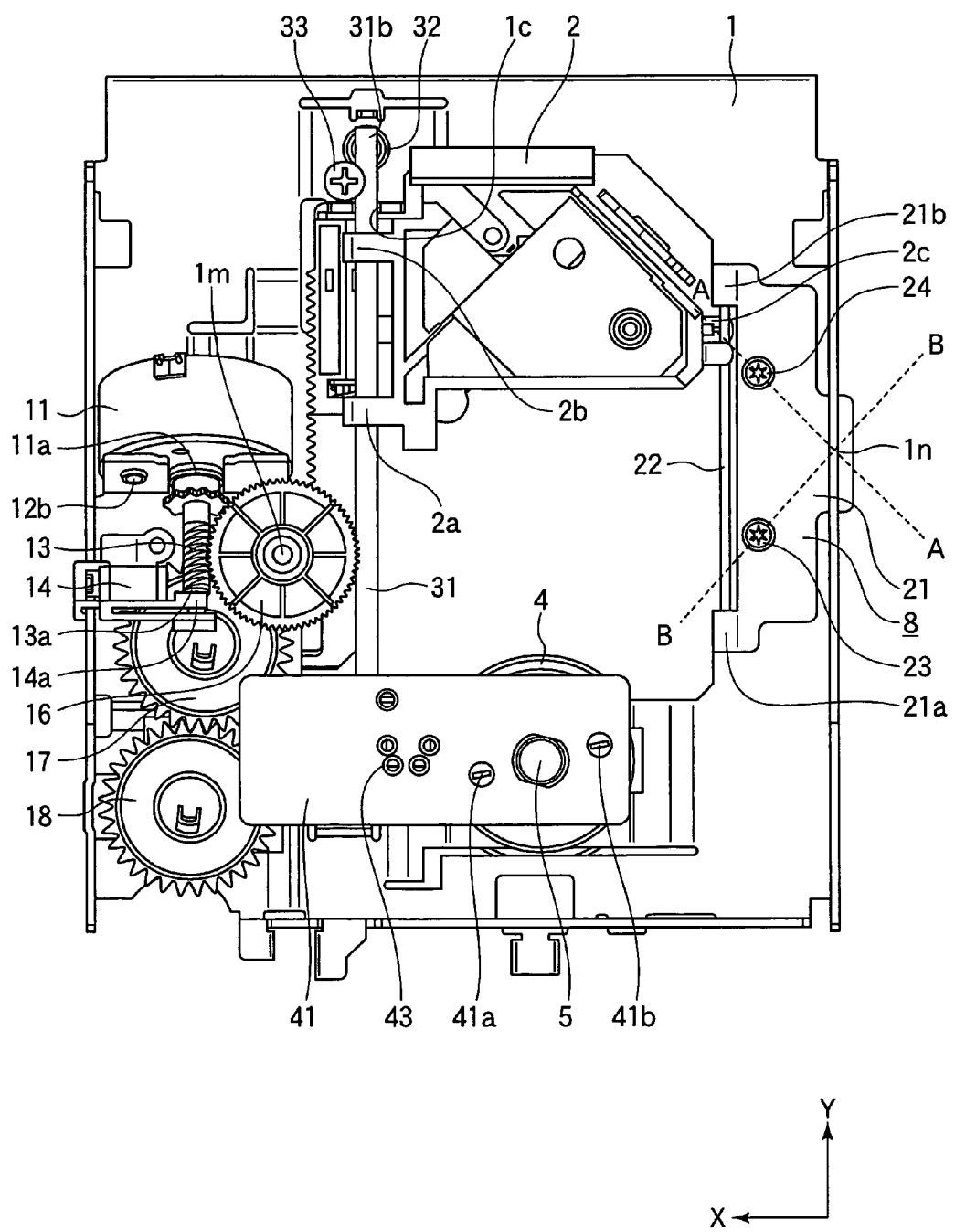
FIG. 7 is a bottom view for illustrating an inclination angle adjusting operation of the optical disk device according to Embodiment 1 of the present invention.

In the above described first adjustment, the shaft-receiving portion 2c of the optical pickup 2 is located on the line B-B (FIG. 4), and the secondary shaft 22 rotates about the line B-B in the second adjustment (FIG. 7). Therefore, the height of the position of the secondary shaft 22 where the optical pickup 2 has been located in the first adjustment does not vary in the second adjustment.

Similarly, in the second adjustment, the shaft-receiving portion 2c of the optical pickup 2 is located on the line A-A (FIG. 7), and the secondary shaft 22 rotates about the line A-A in the first adjustment. Therefore, even if the first adjustment is performed after the second adjustment, the height of the position of the secondary shaft 22 where the optical pickup 2 has been located in the second adjustment does not vary in the first adjustment.

As described above, according to this embodiment, when the optical pickup 2 is located at the end portion on the disk inner circumference side of the movable range for reproduction, the shaft-receiving portion 2c is located on the line B-B, and when the optical pickup 2 is located at the end portion on the disk outer circumference side of the movable range for reproduction, the shaft-receiving portion 2c is located on the line A-A. Therefore, the adjustment of one end of the secondary shaft 22 does not affect the height of other portions of the secondary shaft 22. Accordingly, it is not necessary to repeat the readjustment, and the time required for adjustment can be shortened by a large amount.

In particular, the adjusting screws 23 and 24 engage the inner threaded portions 1k and 1j (FIG. 3), and the screw heads 23a and 24a of the adjusting screws 23 and 24 contacts the adjustment holding portion 21 in the +Z direction. Therefore, the inclination of the adjustment holding portion 21 can be adjusted in two directions with a relatively simple configuration.

Further, the contact portion 21i (the plate-like piece) of the adjustment holding portion 21 is supported by the supporting portion in (a protrusion) provided on the base 1, and therefore it becomes possible to vary the inclination of the adjustment holding portion 21 in a plurality of directions about the supporting portion 1n.

Embodiment 2

Figure 8:
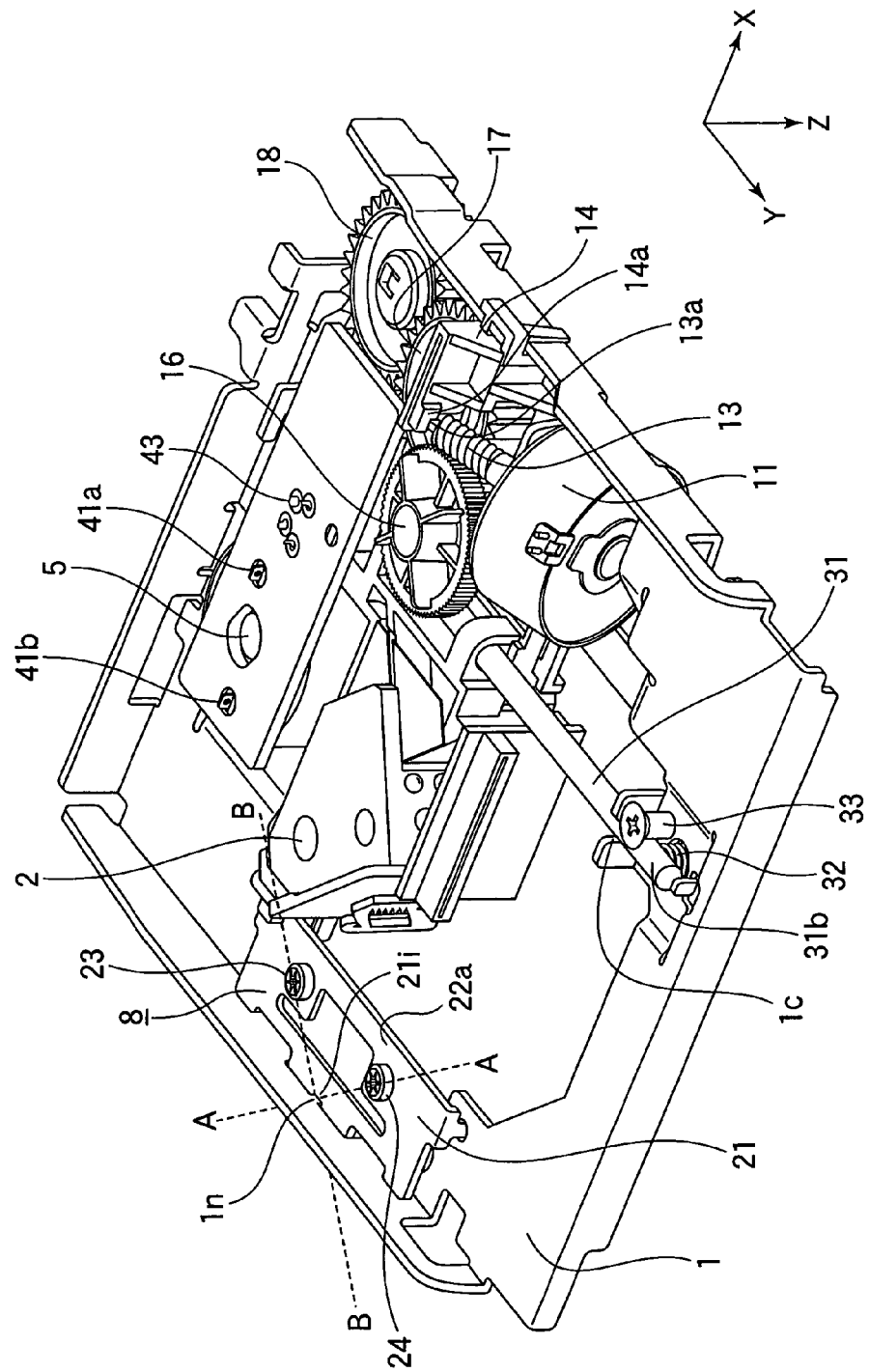
FIG. 8 is a perspective view showing an internal structure of an optical disk device according to Embodiment 2 of the present invention.
Figure 9:
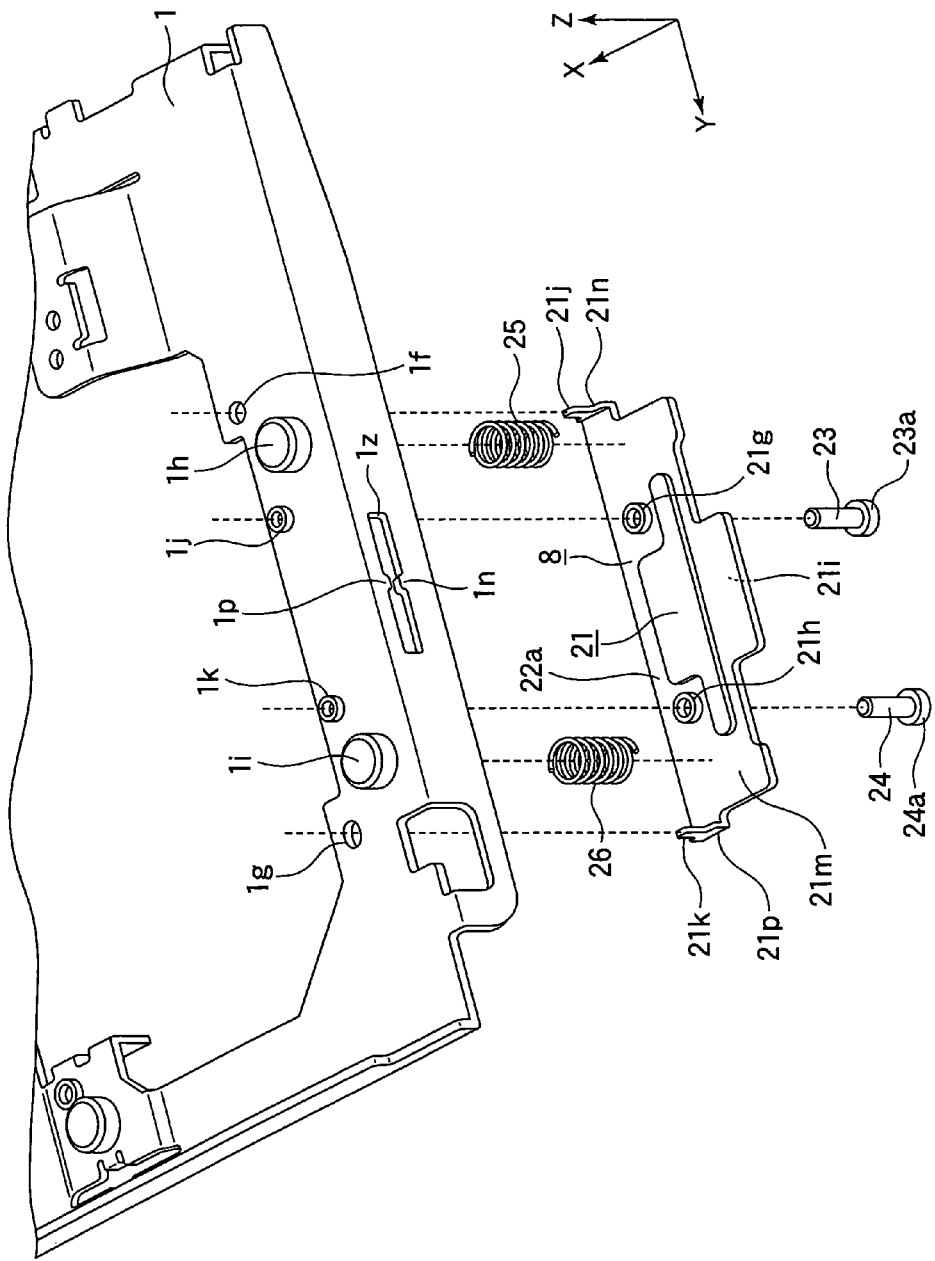
FIG. 9 is an exploded perspective view showing an inclination angle adjusting mechanism of the optical disk device according to Embodiment 2 of the present invention.

FIG. 8 is a perspective view showing an internal configuration of an optical disk device according to Embodiment 2 of the present invention. FIG. 9 is a perspective view showing an inclination angle adjusting mechanism of the optical disk device according to Embodiment 2. As shown in FIG. 8, in this embodiment, the end portion (indicated by a mark 22a in FIG. 22) of the plate-like adjustment holding portion 21 in the X direction is configured to act as the secondary shaft 22 having been described in Embodiment 1.

As shown in FIG. 9, positioning portions (mounting positioning portions) 21j and 21k in the form of protrusions are protruded in the +Z direction from both ends of the adjustment holding portion 21 in the Y direction. The positioning portions 21j and 21k engage positioning holes 1f and 1g formed on the base 1, so that the adjustment holding portion 21 is positioned in the X direction and the Y direction with respect to the base 1. The biasing springs 25 and 26 are sandwiched between the spring holding portions 1h and 1i provided on the base 1 and a flat surface portion 21m of the adjustment holding portion 21, and biases the adjustment holding portion 21 in the -Z direction.

As in Embodiment 1, the adjusting screws 23 and 24 penetrate the through holes 21g and 21h, and engage the inner threaded holes 1j and 1k provided on the base 1. As in Embodiment 1, the adjustment holding portion 21 is biased by the biasing springs 25 and 26 in -Z direction, the supporting portion 1n provided on the base 1 contacts the contact portion 21i of the adjustment holding portion 21, and the screw heads 23a and 24a of the adjusting screws 23 and 24 contact the portions around the through holes 21g and 21h of the adjustment holding portion 21, so that the position of the adjustment holding portion 21 with respect to the base 1 in the Z direction is regulated.

Stepped portions 21n and 21p are formed on the root portions of the above described positioning portions 21j and 21k, which respectively have widths wider than inner diameters of the positioning holes 1f and 1h of the base 1. Further, a receiving portion 1p is formed on the slit 1z (into which the contacting portion 21i of the adjustment holding portion 21 is inserted) and is protruded in -Z direction so that the receiving portion 1p faces the supporting portion 1n. A clearance required for assembling the adjustment holding portion 21 to the base 1 is formed between the adjustment holding portion 21 and the receiving portion 1p as well as the supporting portion 1n. By the contact between the stepped portions 21n and 21p and the portions around the positioning holes 1f and 1g and by the contact between the contact portion 21i and the receiving portion 1p, the position of the adjustment holding portion 21 is regulated in a state where the adjustment holding portion 21 is shifted in +Z direction with respect to the base 1. The other configuration is the same as Embodiment 1.

In this embodiment, the inclination angle adjustment with respect to the optical disk in the tangential direction is performed as in Embodiment 1. The adjustment of one end of the secondary shaft 22 (the end portion 22a of the adjustment holding portion 21 in the X direction) does not cause the height of the other end to vary, and therefore it is not necessary to repeat the readjustment, and the time required for the adjustment can be shortened. Additionally, in this embodiment, a part of the adjustment holding portion 21 (the end portion 22a in the X direction) functions as the secondary shaft portion 22, and therefore the number of components can be reduced, and the manufacturing cost can be reduced.

Further, the positioning portions 21j and 21k are integrally formed with the adjustment holding portion 21 and engage the positioning holes 1f and 1g, so that the position of the adjustment holding portion 21 with respect to the base 1 is determined in the X direction and in the Y direction. Therefore, it becomes possible to regulate the position of the adjustment holding portion 21 even when the impact force is transmitted to the base 1 from the outside of the optical disk device. Accordingly, it becomes possible to prevent the deviation of the adjusting position when the disturbance (impact or the like) is applied, and therefore the reliability of the optical disk device can be enhanced.

Furthermore, the position of the adjustment holding portion 21 is regulated by the contact between the stepped portions 21n and 21p and the positioning holes 1f and 1g and by the contact between the contact portion 21i and the receiving portion 1p when the adjustment holding portion 21 is shifted in the +Z direction. Therefore, even when the impact force is transmitted to the base 1 from the outside of the optical disk device and the adjustment holding portion 21 is shifted in +Z direction, the position of the adjustment holding portion 21 can be regulated at three points. As a result, it becomes possible to circumvent the situation where the adjustment holding portion 21 cannot return to its original position due to a deadlock or entangling caused by the external impact, and therefore the reliability of the optical disk device can further be enhanced.

Embodiment 3

Figure 10:
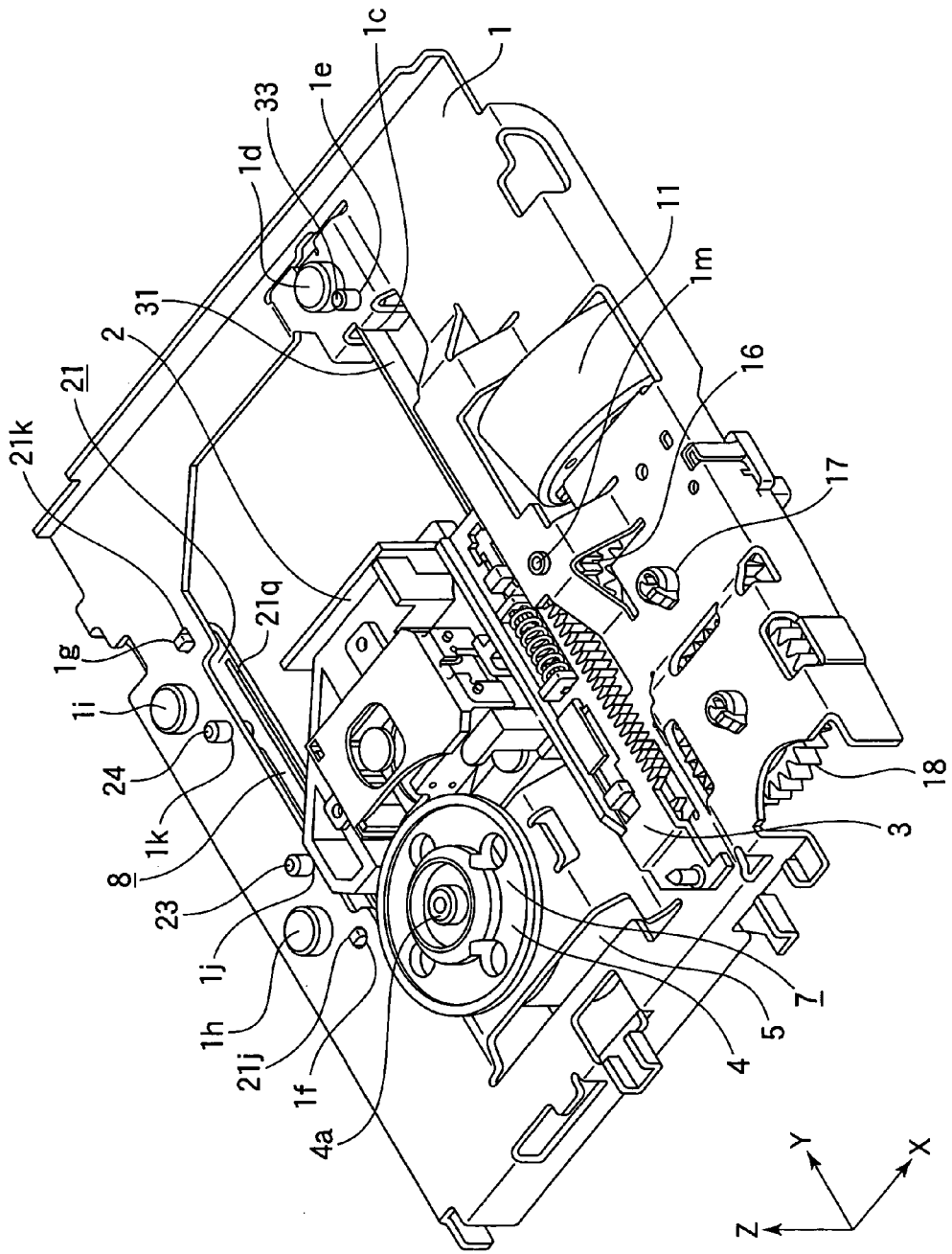
FIG. 10 is a perspective view showing an internal structure of an optical disk device according to Embodiment 3 of the present invention.
Figure 11:
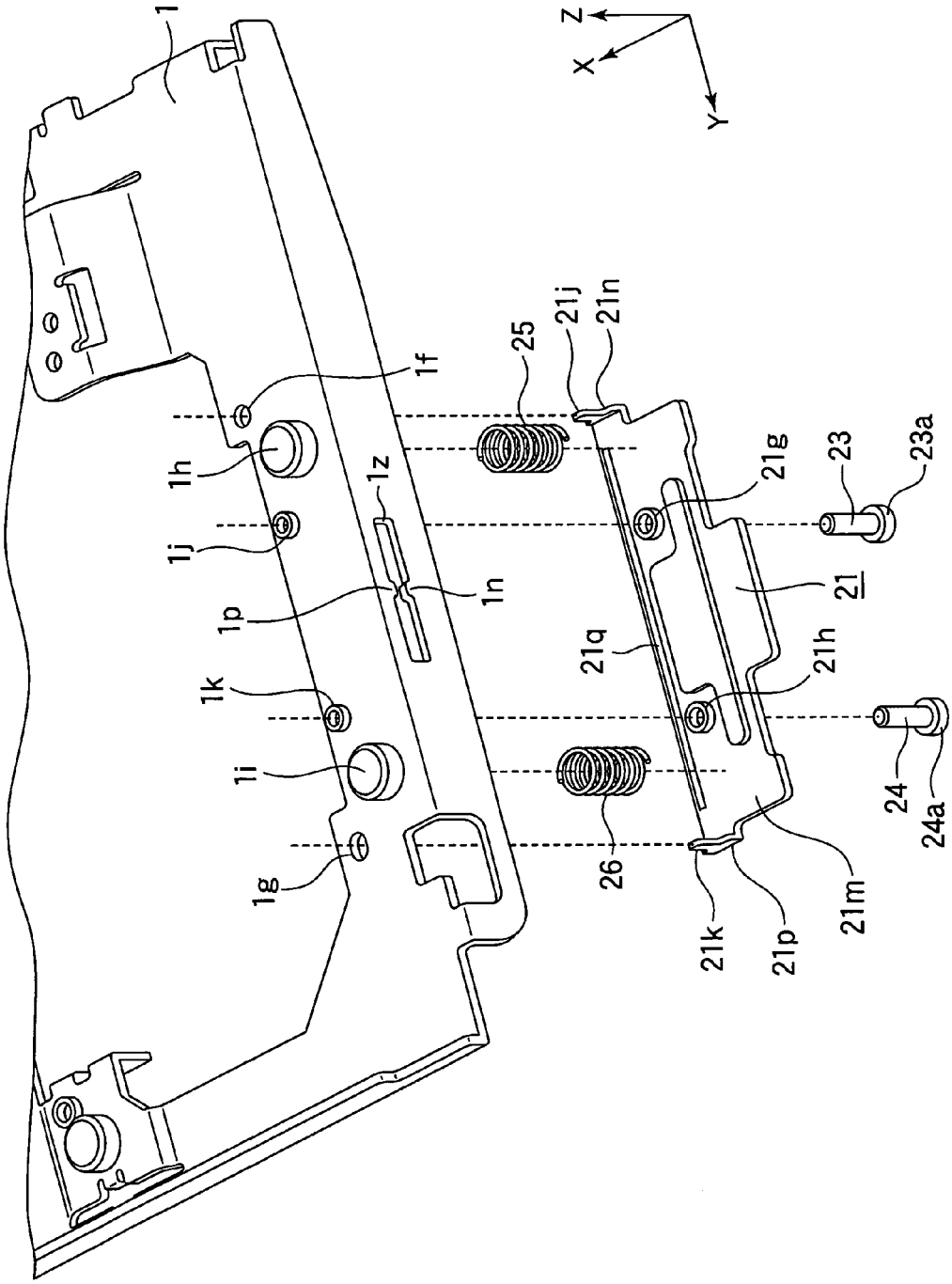
FIG. 11 is an exploded perspective view showing an inclination adjusting mechanism of the optical disk device according to Embodiment 3 of the present invention.
Figure 12:
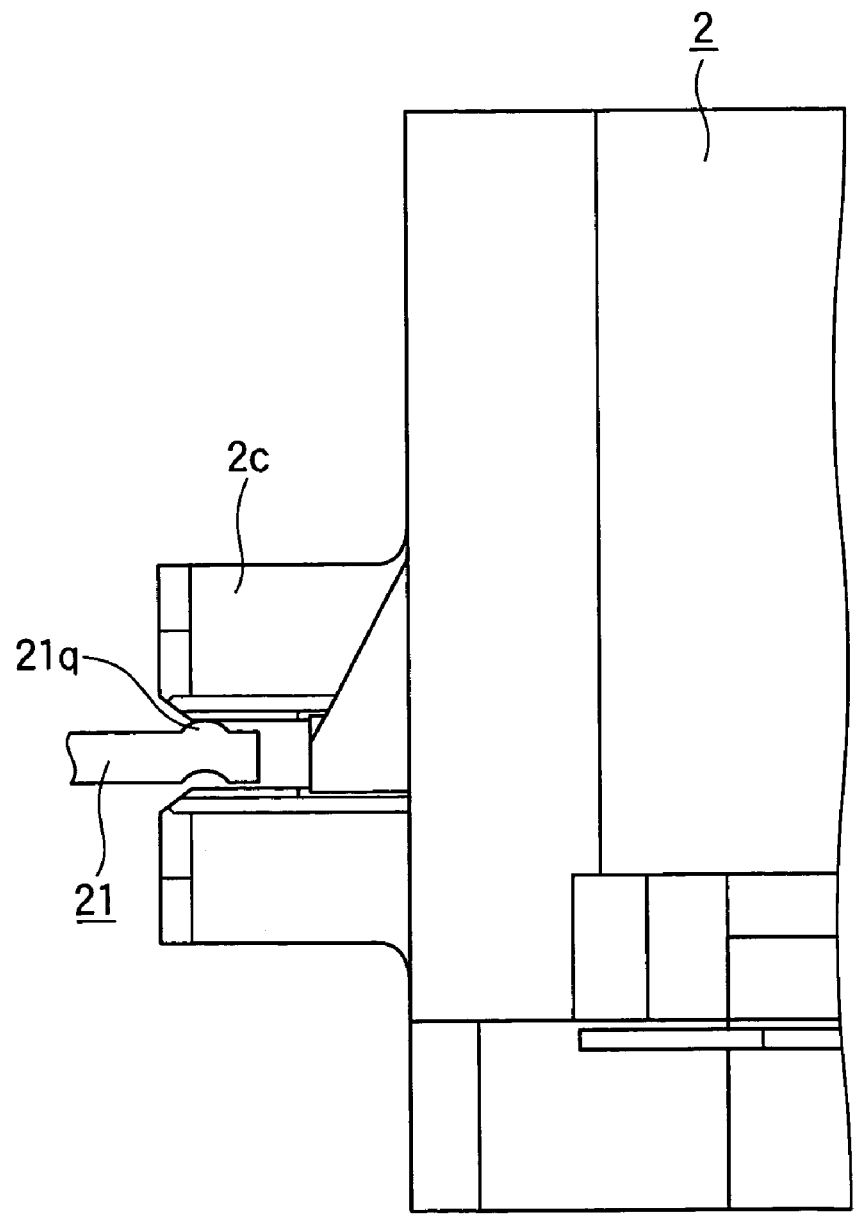
FIG. 12 is an enlarged view showing an optical pickup and a secondary shaft of the optical disk device according to Embodiment 3 of the present invention.

FIG. 10 is a perspective view showing the optical disk device according to Embodiment 3 of the present invention as seen from above. FIG. 11 is an exploded perspective view of an inclination angle adjusting mechanism of the optical disk device according to Embodiment 3 of the present invention. FIG. 12 is a partially sectional view showing a secondary shaft and an optical pickup of the optical disk device according to Embodiment 3 of the present invention.

As shown in FIGS. 10 through 12, in this embodiment, a projecting portion 21q (FIGS. 11 and 12) having the shape of a convex in the form of a circular arc in XZ cross section is formed on the end surface (the end surface on the inner side of the optical disk device) of the plate-like adjustment holding portion 21 in the X direction. The projecting portion 21q is elongated in the Y direction, and constantly contacts the shaft-receiving portion 2c of the optical pickup 2 in the movable range of the optical pickup 2. The projecting portion 21q constitutes a secondary shaft for guiding the optical pickup 2. The other configuration is the same as Embodiment 2.

In this embodiment, the projecting portion 21q that constitutes the secondary shaft guiding the optical pickup 2 has the sectional shape of a convex in the form of a circular arc, and therefore the shaft-receiving portion 2c is kept in contact with the curved surface the secondary shaft (the projecting portion 21q) even when the inclination angle in the tangential direction of the disk (in the rotational direction about a line parallel to the Y direction) varies. Therefore, it becomes possible to prevent the edge-to-edge contact between the shaft-receiving portion 2c and the secondary shaft. As a result, uneven wearing can be restricted, and the increase in the sliding load can be restricted, with the result that the reliability of the optical disk device can be enhanced.

Further, the height of the secondary shaft (the projecting portion 21q) contacting the shaft-receiving portion 2c of the optical pickup 2 in the Z direction directly affects the inclination angle of the optical pickup 2 in the tangential direction of the disk (the rotational direction about the line parallel to the Y direction), and therefore the straightness is required in the movable range of the optical pickup for reproduction. By forming the secondary shaft as the projecting portion 21q, it becomes possible to perform a press molding while applying a pressure particularly to a part which is to be the projecting portion 21q (in the case where the adjustment holding portion 21 is manufactured by, for example, a press molding of a sheet metal). With this, it becomes possible to restrict the variation of surface condition of a plate (as a material), and to enhance the accuracy of part.

In the explanation of the above described Embodiments 1 through 3, expressions such as "up", "down", "left" and "right" are used. However, these expressions are merely for convenience of illustration, and do not limit the orientation of the optical disk device. For example, the device can be configured so that the "upper side" in the explanation faces downward or sideways.

In the explanation of the above described Embodiments 1 through 3, the first adjustment is performed in a state where the optical pickup 2 is located at the end portion on the inner periphery side of the movable range for reproduction, and then the second adjustment is performed in a state where the optical pickup 2 is located at the end portion on the outer periphery side of the movable range for reproduction. However, the first adjustment and the second adjustment can be performed in reverse order.

The invention claimed is:

1. An optical disk device comprising:
a base;
a disk rotation driving mechanism provided on said base, said disk rotation driving mechanism rotating an optical disk;
an optical pickup on which an optical system is mounted, said optical system emitting a light beam onto said optical disk rotated by said disk rotation driving mechanism, said optical pickup having a main shaft-receiving portion and a secondary shaft-receiving portion;
a main shaft and a secondary shaft that respectively engages said main shaft-receiving portion and said secondary shaft-receiving portion, so as to guide said optical pickup movably in a radial direction, and
an adjustment holding portion that holds said secondary shaft so that an inclination of said secondary shaft with respect to said base is adjustable,
wherein said adjustment holding portion is mounted to said base at first, second and third supporting points,
wherein heights of said second and third supporting points are adjustable in the direction of a rotation axis of said optical disk,
wherein, when said optical pickup is located at a first position on the inner circumference side of said optical disk, said secondary shaft-receiving portion is located on a line connecting said first supporting point and said second supporting point, and
wherein, when said optical pickup is located at a second position on the outer circumference side of said optical disk, said secondary shaft-receiving portion is located on a line connecting said first supporting point and said third supporting point.

2. The optical disk device according to claim 1, wherein said first position on the inner circumference side of said optical disk is an end portion of a movable range of said optical pickup during reproduction on the inner circumference side of said optical disk, and
wherein said second position on the outer circumference side of said optical disk is an end portion of a movable range of said optical pickup during reproduction on the outer circumference side of said optical disk.

3. The optical disk device according to claim 1, wherein each of said second supporting point and said third point comprises:
an adjusting screw including a screw portion penetrating said adjustment holding portion in the direction of a rotation axis of said optical disk and a head portion that contacts a side of said adjustment holding portion opposite to said base, and
an internal threaded portion formed on said base so that said adjusting screw engages said internal threaded portion.

4. The optical disk device according to claim 1, wherein said first supporting point comprises:
a plate-like piece formed on said adjustment holding portion and extending in the direction perpendicular to a rotation axis of said optical disk, and
a projecting portion foamed on said base so that said projecting portion contacts said plate-like piece of said adjustment holding portion.

5. The optical disk device according to claim 1, wherein said secondary shaft is integrally formed with said adjustment holding portion.

6. The optical disk device according to claim 5, wherein said secondary shaft has a shape of a convex substantially in the form of a circular arc in a cross section perpendicular to an axial direction thereof.

7. The optical disk device according to claim 1, wherein said adjustment holding portion includes a mounting positioning portion that regulates a mounting position of said adjustment holding portion with respect to said base.

8. An adjustment method of an optical disk device according to claim 1, said method comprising the steps of:
adjusting the height of an end of said secondary shaft while monitoring a reproduced signal from said optical pickup in a state where said optical pickup is located at said first position, and
adjusting the height of the other end of said secondary shaft while monitoring a reproduced signal from said optical pickup in a state where said optical pickup is located at said second position.

* * * * *